United States Patent [19]

Cianci, Jr. et al.

[11] 4,331,409
[45] May 25, 1982

[54] PHOTOGRAPHIC APPARATUS WITH DUAL FUNCTION SONIC TRANSDUCER

[75] Inventors: William J. Cianci, Jr., North Andover; Donato F. Pizzuti, Lynnfield, both of Mass.

[73] Assignee: Polaroid Corporation, Cambridge, Mass.

[21] Appl. No.: 249,121

[22] Filed: Mar. 30, 1981

[51] Int. Cl.³ .................. G03B 13/20; G03B 17/36; G03B 17/18
[52] U.S. Cl. .................. 354/195; 354/127; 354/198; 354/217; 354/289
[58] Field of Search ............... 354/195, 198, 289, 127, 354/217

[56] References Cited

U.S. PATENT DOCUMENTS

| | | |
|---|---|---|
| 3,608,454 | 9/1971 | Shenk ........................... 95/13 |
| 3,774,516 | 11/1973 | Burgarella et al. .................. 95/42 |
| 4,005,449 | 1/1977 | Ellin ........................... 354/128 |
| 4,064,519 | 12/1977 | Kee ........................... 354/141 |
| 4,085,297 | 4/1978 | Paglia ........................... 179/111 R |
| 4,156,567 | 5/1979 | Ostrowski ........................... 354/195 |
| 4,168,895 | 9/1979 | Pizzuti ........................... 354/195 |
| 4,199,246 | 4/1980 | Muggli ........................... 354/195 |

*Primary Examiner*—Russell E. Adams
*Attorney, Agent, or Firm*—John S. Vale

[57] ABSTRACT

An autofocusing camera having an ultrasonic ranging system, formed in part by a sonic transducer, for measuring subject distance is provided with an audio system which incorporates the same sonic transducer for providing the camera operator with audible information, such as warning signals indicating that the camera is out of film or that the flash illumination system is not in its operative or ready state.

11 Claims, 3 Drawing Figures

PHOTOGRAPHIC APPARATUS WITH DUAL FUNCTION SONIC TRANSDUCER

BACKGROUND OF THE INVENTION

The present invention relates to the field of photography and, more specifically, to photographic apparatus such as autofocusing cameras employing sonic ranging systems for measuring subject distance.

Highly-automated, self-developing cameras of this type are marketed presently by Polaroid Corporation, Cambridge, Massachusetts, under the model designations SX-70 Autofocus and Pronto! Autofocus Land Cameras. For representative examples of these cameras in the patent literature, see commonly-assigned U.S. Pat. Nos. 4,156,567 and 4,168,895.

The sonic ranging system is powered by a flat battery in the film pack and, upon energization, emits a burst of ultrasonic frequency (50–65 khz) from a sonic transducer towards the subject. Thereafter, the same transducer, acting as a microphone, detects an echo signal reflected back from the subject. The time interval between transmission and echo detection is directly proportional to twice the distance to the subject and this measurement is used to provide a ranging signal indicative of subject distance. In turn, the ranging signal is used to control a lens drive system for setting the lens at a corresponding focus position. Representative examples of such a ranging system and a transducer suitable for use therein may be found in commonly assigned U.S. Pat. Nos. 4,199,246 and 4,085,297.

For flash mode operation, cameras of this type may be configured to receive a flashbar (an array of flashbulbs) or an accessory strobe. Alternatively, the strobe may be built into the camera housing. The battery in the camera film pack is used to fire the flashbulbs or strobe unit and in some embodiments is also employed to charge the capacitor in the strobe unit.

To prevent waste of film and/or flashbulbs, certain component status sensing and operating cycle inhibiting circuits are built into these cameras.

For example, commonly-assigned U.S. Pat. No. 4,005,449 discloses a system for automatically inhibiting actuation of the exposure cycle when all of the flash units in the forwardly facing array have been expended thereby preventing waste of a film unit. This system additionally provides a perceptible warning signal (lamp or LED next to the viewfinder) apprising the operator of the expended status of the flash array.

Also see commonly-assigned U.S. Pat. No. 4,064,519 where commencement of the exposure cycle is automatically inhibited if the strobe unit is not turned on, or its capacitor is not fully charged, or if all of the lamps in the flash array are expended. This inhibit system also triggers an operator warning circuit.

Commonly-assigned U.S. Pat. No. 3,774,516 provides a system which is responsive to rotation of the film counter to its "empty" position for inhibiting operation of the flash system when there is no more film in the pack, thereby preventing waste of a flashbulb.

There are numerous conditions—empty film pack, all bulbs expended, strobe off, strobe not fully charged, etc.—that will cause an automatic inhibit of at least part of the camera's operating cycle until the camera operator makes the appropriate correction. To aid the operator, some of these camera systems provide some type of warning signal, usually visual in nature, to indicate the source of the problem.

In autofocusing cameras which include a sonic ranging system, and, additionally, may include several of the inhibit systems previously described, there is a need for quickly and clearly advising the operator as to which condition is causing the inhibit so that he or she may take the appropriate corrective action without having to check all of the possible causes.

Visual information and warning systems are commonly employed in automatic cameras, usually in the form of a multi image display about the periphery of the viewfinder for indicating scene lighting conditions, selected aperture, shutter speed and to warn that the strobe is not fully charged, all flashlamps expended, etc. It would seem that the addition of more visual warning indicators within or around the viewfinder area may be more confusing than helpful to the operator. On the other hand, an audible warning system may be preferable for separating picture taking information provided visually and indicating that the camera is in a ready condition from audible warnings that say something is wrong and corrective action must be taken.

In the past, audible warning systems have been incorporated into self-developing cameras in conjunction with timing circuits that are used to time the imbibition interval for peel apart self-developing film units. For example, see commonly-assigned U.S. Pat. No. 3,608,454 and copending application U.S. Ser. No. 152,858 filed on May 23, 1980, wherein one or more sonic transducers mounted on the camera housing are electrically driven in the audio frequency range to emit an audible warning tone at the end of the timed cycle.

Of necessity, these transducers are quite large in size and the addition of this component to a camera already having a transducer employed in the sonic ranging system would tend to increase the overall size of the camera and be counter-productive in meeting design goals to minimize camera size.

Therefore, it is an object of the present invention to incorporate an audible information system into a camera of the type that includes a sonic ranging system without significantly increasing the size of the camera.

It is another object of the invention to provide such a camera with an audio information system which utilizes at least some of the components forming part of the sonic ranging system to minimize camera complexity and manufacturing costs.

Other objects of the invention will, in part, be obvious and will, in part, appear hereinafter.

SUMMARY OF THE INVENTION

The present invention provides a photographic apparatus such as a camera including a sonic ranging system for measuring subject distance and an audio system for providing audible information (e.g., out-of-film, strobe-not-fully-charged, etc. indications) to advise the camera operator that some part of the camera system is not ready for operation and/or to provide any other type of audible information that may be useful to the operator.

The ranging system is operative to provide a ranging signal indicative of subject distance and is formed in part by a sonic transducer that is electrically driven in the ultrasonic frequency range for emitting non-audible energy towards a subject and for thereafter detecting an echo therefrom in conjunction with providing the ranging signal.

It has been found that the transducer which is normally driven in the ultrasonic frequency range, approximately 50-65 khz, for ranging is also capable of emitting an audio output, although at greatly diminished but still useful efficiency, when electrically driven in the audio frequency range of approximately 3-5 khz.

Therefore, the photographic apparatus embodying the present invention includes an audio system formed in part by the same sonic transducer and means for electrically driving the transducer in the audio frequency range for providing audible information to the camera operator.

Advantageously, the apparatus embodying the present invention assigns a second function (audio information output) to the existing transducer provided for the ranging system and thereby add the audio information system feature without substantially increasing the size of the camera. Also, this is achieved at a relatively low cost by not having to use a separate speaker in the audio system.

Additionally, means are provided for detecting the status of various camera components and/or subsystems and for generating a corresponding encoded audio signal for each to audibly identify which component or subsystem is not operative or ready so that the operator quickly may take corrective action when necessary.

The present invention is also directed to a sonic assembly for use in photographic apparatus wherein a sonic transducer in the assembly forms part of both an ultrasonic ranging system and an audio information system.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
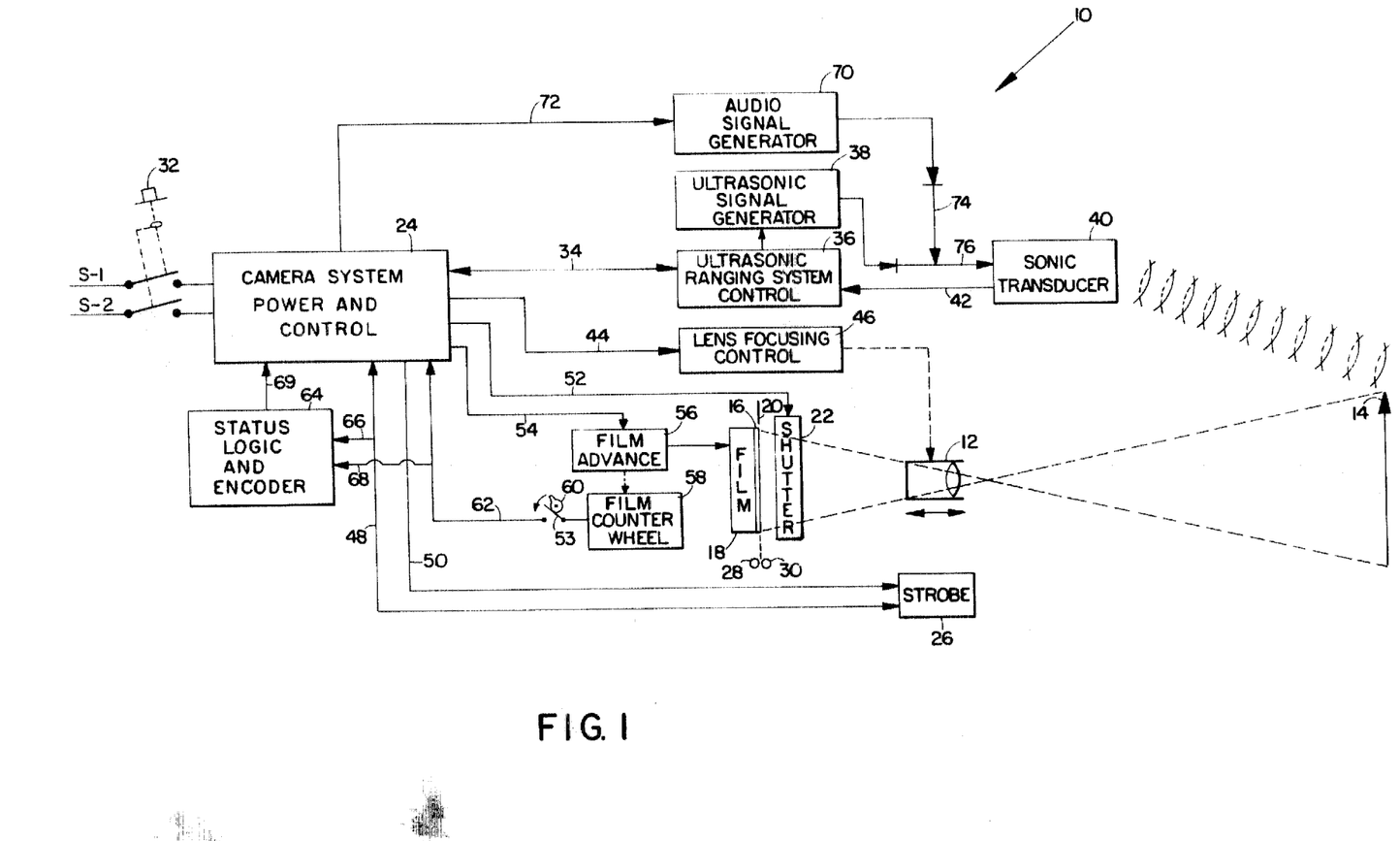
FIG. 1 is a functional block diagram of an autofocusing camera embodying the present invention and incorporating an audio system therein.

FIG. 1 shows, in functional block diagram form, a highly-automated, autofocusing, self-developing camera 10 embodying the present invention. However, it will be understood that the novel aspects of the present invention are not limited in use to cameras only but may be incorporated into other photographic apparatus such as an enlarger or other appropriate photographic devices and systems.

Camera 10 includes an axially displaceable objective lens 12 for forming an image of a subject (represented by vertical arrow 14) on the forwardmost integral-type self-developing film unit 16, in film container 18, located at the focal or film plane 20 of camera 10. Located between film plane 20 and objective lens 12 is an electrically operated shutter 22 for regulating the transmission of image forming light rays to the forwardmost film unit 16.

A camera system power and control circuit 24 is provided for distributing electrical energy (preferably provided from a flat battery in the bottom of film container 18) and providing the electronic logic for controlling the various other components and subsystems forming camera 10. These include a sonic ranging and lens focusing system; a flash illumination system, which may include a strobe unit 26 or an incandescent lamp or flashbar unit (not shown); a post-exposure film handling system for advancing the exposed film unit between a pair of motor driven processing rollers 28 and 30; and a later-to-be-described audio system for providing audible information to the camera operator.

The automatic ranging and focusing cycle is initiated by the operator pushing inwardly to a halfway position on actuator button 32 to close switch S1 and provide an actuating logic input signal to circuit 24. Further depression of button 32 from the halfway position to its terminal position will effect the closure of a second switch S2 which provides a logic input signal to circuit 24 causing it to initiate an exposure and film processing cycle. Thus the parallel switches S1 and S2 are operated in sequence rather than together.

In response to the S1 input signal, circuit 24 provides an output signal over line 34 which triggers an ultrasonic ranging system control circuit 36. Circuit 36 activates an ultrasonic signal generator 38 which feeds its output to a sonic transducer 40 for electrically driving it in the ultrasonic frequency range. In response to a signal program provided from generator 38, sonic transducer 40 emits a burst of ultrasonic energy in the 50-65 khz range toward the subject 14. Following transmission, transducer 40 acts as a microphone and detects an echo reflected back from the subject and provides an echo detect signal along line 42 to the ranging control circuit 36. Circuit 36 includes a clock subcircuit for measuring the interval between transmission and echo detect which is directly proportional to twice the distance between the sonic transducer 40 and the subject 14. Using this time measurement, circuit 36 then provides a range signal, indicative of subject distance, over line 34 back to circuit 24. Circuit 24 utilizes the range signal to derive a corresponding focus position for lens 12 and provides an appropriate input over line 44 to a lens focusing control circuit 46. Using this input, circuit 46 controls the operation of an electrical motor (not shown) which is connected in driving relation to lens 12 for axially displacing it to a corresponding focus position.

In order for strobe unit 26 to deliver its full rated light output during the exposure cycle, its storage capacitor must be fully charged. Circuit 24 monitors the state of charge of the strobe unit capacitor over line 48 and will automatically inhibit certain of the camera functions responsive to the closing of S2 if the capacitor is not fully charged. Thus a signal on line 48 is indicative of the state of charge of the strobe unit capacitor. During the course of an exposure cycle which includes flash illumination, circuit 24 provides a flash fire signal to strobe unit 26 over line 50 in a coordinated manner with the operation of shutter 22. In certain embodiments of the flash control system, a quench signal is also provided over line 50 or over an additional line to strobe unit 26. If a flashbar is used in place of strobe unit 26, circuit 24 monitors the condition of the remaining flash lamps in the array over line 48. That is, if all of the lamps have been expended, a logic signal will be provided over line 48 causing circuit 24 to inhibit an exposure cycle in response to the closure of S2 thereby saving the waste of a film unit. In certain embodiments, the strobe unit may be charged from the battery in film container 18 rather than from an independent electrical source in the strobe unit. In this instance, the charging function may be initiated by the closure of S1 so as to occur simultaneously with the ranging operation or a third sequential switch may be provided to serve as a logic level input to circuit 24 to trigger the charging operations before the closure of S1.

Assuming now that the strobe unit 26 is fully charged and S1 has been closed to effect ranging and lens focusing, the operator then initiates an exposure cycle by pushing further down on button 32 to close S2. In response to the S2 input, circuit 24 provides shutter operating signals over line 52 to the shutter 22 to effect exposure of the forwardmost film unit 16. Although not shown in the diagram, a photocell circuit for monitoring scene brightness may be utilized to provide an input to circuit 24 in a well-known manner to control the provision of certain shutter operating signals. As noted earlier, circuit 24 provides the flash fire signal over line 50 to operate strobe unit 26 at an appropriate time during that interval when the shutter 22 is open.

Following the termination of exposure by the closing of shutter 22, circuit 24 provides a logic signal over line 54 to activate a film advance system 56. System 56 includes a pick which advances the exposed film unit out of the film container 18 and into the bite of the pressure applying rollers 28 and 30 which are rotatably driven under the control of system 56 to advance the film unit therebetween and thereby release and distribute a fluid processing composition between predetermined layers of the film unit to initiate a well-known development and diffusion transfer process.

In response to each actuation of the film advance system 56, a film counter wheel 58 is indexed one increment to show the number of film units 16 remaining in film container 18. Mechanically connected to wheel 58 is a cam 60 which is configured to close a normally open switch S3 in line 62 leading to circuit 24 when the wheel 58 indicates "empty" thereby providing a logic signal input to circuit 24 for the purpose of inhibiting certain camera operations including the firing of the strobe unit 26 when the camera is out of film. Switch S3 is automatically reopened in response to the resetting of the counter wheel 58 when a new film container 18 is inserted into the holding chamber of the camera.

Thus it has been seen that certain electrical signals such as the charge status of the strobe unit 26 provided over line 48 and the "film empty" signal provided over line 62 upon closure of switch S3 are available within the camera mainly for the purpose of providing inputs to circuit 24 for effecting the inhibition of operation of certain camera subsystems either to prevent waste of a film unit or the operation of the flash illumination system when there is no film in the camera. When these inhibitions occur, the operator knows that there is some corrective action to be taken but as yet he is not provided with any indication as to exactly what the trouble is.

As noted earlier, certain cameras in the prior art utilize warning lights to indicate these failures. However, the present invention contemplates providing an audible signal to the camera operator, preferably by including an audio signaling system which is formed in part by the same sonic transducer 40 that is used in the ultrasonic ranging system.

Therefore, camera 10 is additionally provided with means for ascertaining the status of certain subsystems in the camera, means for encoding a signal indicative of which one of a plurality of systems is not in a ready status, and means responsive to the encoded signals for electrically driving the sonic transducer 40 in the audio frequency range, for example, approximately 3–5 khz., to provide this corresponding information in audible form to the camera operator.

As best shown In FIG. 1, camera 10 includes a status logic and encoder circuit 64 which is provided with the flash status signal from line 48 over connecting line 66 and the film count indication signal from line 62 over connecting line 68. In response to each of these inputs, circuit 64 provides over line 69 a unique correlated output signal to circuit 24 which, in turn, provides a correlated output to actuate audio signal generator 70 over line 72. The output from generator 70 is provided over line 74 through the input line 76 of the sonic transducer 40. As shown blocking diodes are provided in lines 74 and 76 to present crosstalks between generators 38 and 70.

In the illustrated embodiment, when the strobe unit 26 is not fully charged, operation of camera 10 is inhibited automatically by circuit 24 and a two distinct and relatively short audio tone signals are emitted from transducer 40. When camera 10 is out of film, the audio system operates to produce a long single audio tone signal thereby providing the operator with a different audible signal from the indication relating to the strobe not being fully charged.

Because the present invention is mainly concerned with the addition of an audio information system to an autofocus camera, wherein the existing sonic transducer 40 serves as part of both the ultrasonic ranging system and the audio information system, the other aspects and subsystems of camera 10 will not be described further because the details of their structure and operation, beyond what has been described in conjunction with FIG. 1, are not necessary to the understanding of the present invention.

For an example of a self-developing camera including a logic control system suitable for use in the present invention and further including a film counter actuated switch for inhibiting flash operation when all of the film units in the film container have been expended, reference may be had to commonly-assigned U.S. Pat. No. 3,774,516.

Other flash inhibit arrangements are disclosed in commonly-assigned U.S. Pat. Nos. 4,064,519; 4,162,836; 4,182,561 and 4,005,449.

Examples of ranging and lens focusing modules suitable for use in camera 10 may be found in commonly-assigned U.S. Pat. Nos. 4,156,567 and 4,168,895.

Details of the automatic ranging and lens focusing subsystems may be found in commonly-assigned U.S. Pat. Nos. 4,199,244 and 4,119,246.

Examples of sonic transducer 40 suitable for use in camera 10 are set forth in commonly-assigned U.S. Pat. Nos. 4,081,626; 4,085,297 and 4,215,249. All of the commonly-assigned U.S. Patents identified in the above paragraphs are incorporated by reference herein.

Figure 2:
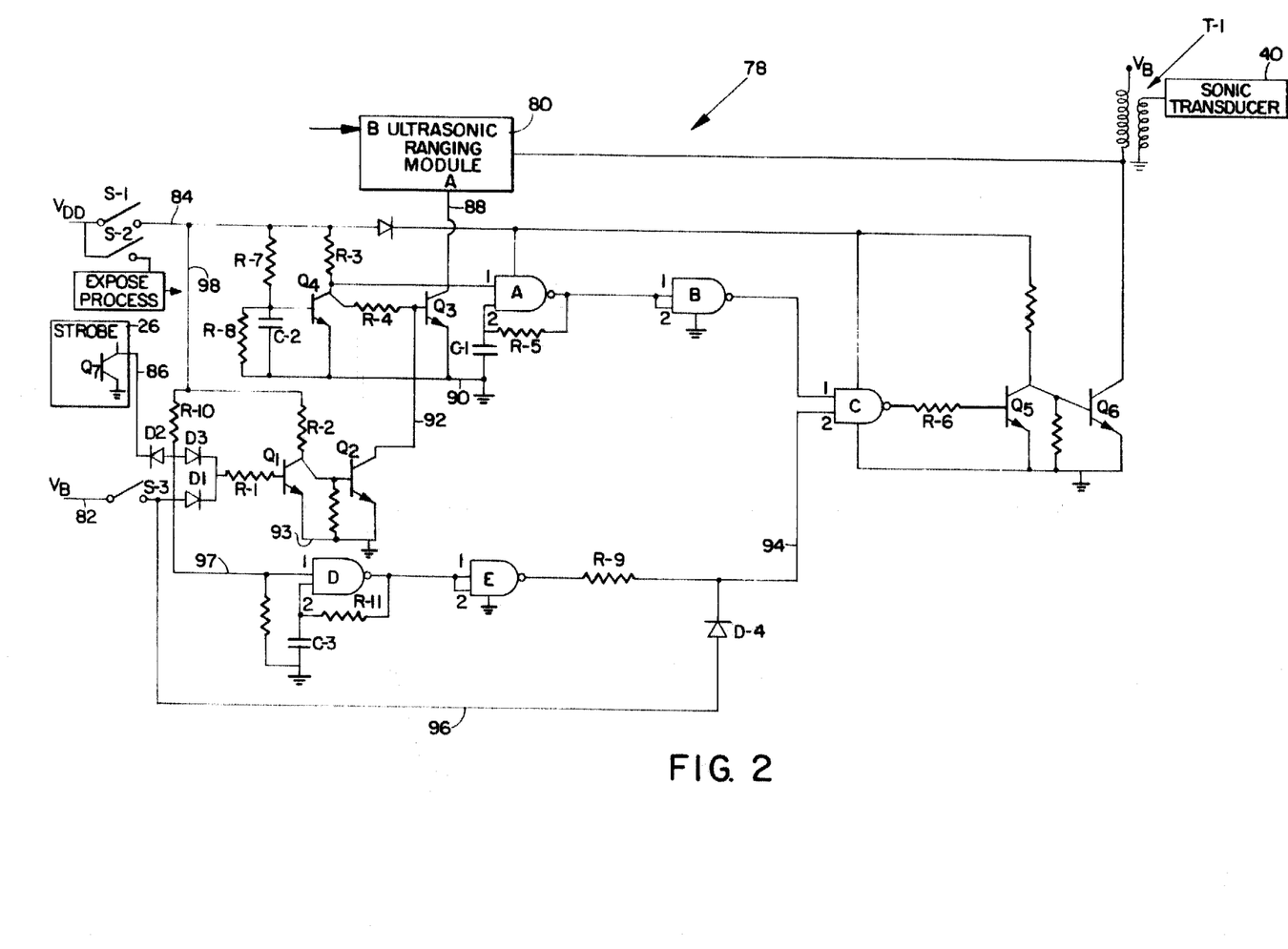
FIG. 2 is a circuit diagram of selected portions of the camera's audio and ranging system.

FIG. 2 is a circuit diagram which includes the status logic and encoder circuit 64, portions of camera system power and control circuit 24, audio signal generator 70, and the ultrasonic ranging system control circuit 36 along with the ultrasonic signal generator 38 shown as a single ultrasonic ranging module 80. This circuit carries the numerical designation 78.

Electrical energy for circuit 78 preferably is derived from the flat 6-volt battery in the film container. These batteries are well suited for delivering relatively large amounts of power (2-2.5 amps at 6 volts) during short operating cycles such as when the motor is used to drive the processing rollers 28 and 30. For a representative example of the battery configuration, see commonly-assigned U.S. Pat. No. 4,152,825.

Positive battery voltage, $V_b$, is supplied to the positive terminal of the primary winding of a transformer T1 that electrically drives the sonic transducer 40 connected to the secondary winding of T1. Battery voltage $V_b$ is also applied along input line 82 when switch S3 is closed in response to the film counter wheel 58 reaching its "empty" position. The semiconductor components used in circuit 78 are of the complementary MOS type (CMOS) and the positive power supply voltage $V_{dd}$, derived from the battery, is supplied to the circuit along supply line 84 in response to the closure of switch S1. The transistors Q1–Q7 generally are of the NPN type connected in the common emitter configuration.

The logic gates A–E are each one-quarter of a COS/MOS quad 2-input NAND Schmidt triggers. That is, four such gates are packaged in a single integrated chip carrying the designation CD4093B. Each gate circuit functions as a 2-input NAND gate with Schmidt trigger action on both inputs. As will become apparent later, gates A and B serve as an audio frequency astable multivibrator or oscillator and inverter, respectively; gate C is a control gate regulating the transmission of the audio frequency output for driving the transducer transformer T1; and gates D and E serve as a low frequency astable multivibrator or oscillator and inverter, respectively, for modulating or encoding the audio frequency output when the strobe unit 26 is not fully charged.

In conjunction with the following description of circuit 78 it will be understood that when the inputs or outputs of the listed components are at ground reference potential, they are referred to as "low" and may be identified digitally as 0. Conversely, when these inputs and outputs assume or approach the voltage status of the power supply, they are referred to as being "high" and are given the binary designation 1.

Inputs to circuit 78 include the S1 and S2 switches, which, when closed in sequence, initiate the ranging and focusing cycle and thereafter the exposure and processing cycle; the S3 switch in line 82, which is closed when the film pack is empty and supplies battery voltage through forward biased diode D1 and resistor R1 to the base of transistor Q1; and an input from the collector of Q7 in the strobe charging circuit along input line 86, to a reverse biased diode D2 which is connected in series with a forward biased diode D3, connected in common with D1 to R1 to provide an input to the base of Q1. Thus, switch S3 and transistor Q7 serve as status indicators or inputs relating to the supply of remaining film units 16 and the state of charge of the strobe unit 26, respectively.

Camera 10 is configured to operate in three different pre-exposure states. One is the normal or ready state, when there is film in the film container 18 and the strobe unit 26 is fully charged. In this state, the camera will operate in a normal cycle; that is, the ranging and lens focusing cycle responsive to the closure of S1 will be followed by the film exposure and processing cycle responsive to the subsequent closure of S2.

For the normal cycle to occur, the ultrasonic ranging module 80 must be in an operative or enabled state. If module 80 is disenabled, then the rest of the control circuitry in camera 10 will also be disenabled. To provide this enabling function, the collector of Q3 is connected over line 88 to terminal A of module 80. When Q3 is turned off, module 80 is enabled and is responsive to an input at terminal B to drive the transducer transformer T1 in the normal ultrasonic ranging mode. However, when Q3 is turned on, a conductive path to ground potential line 90 is established thereby shorting out an oscillator in module 80 and disenabling its operation so that it is no longer responsive to an input for electrically driving sonic transducer 40. Again, this will also disable the circuits needed to operate the exposure and processing cycle.

When the strobe unit 26 is fully charged, Q7 is turned on and brings the voltage on input line 86 down to ground potential. Also, when there is film in the film container 18, switch S3 is opened and there is no power applied to diode D1. Thus, the input to the base of Q1 is low so it is turned off.

In response to closing switch S1, the high impedance of Q1 will divide the voltage $V_{dd}$ with resistor R2 causing the voltage at the collector of Q1 to become high. This serves as the input to the base of Q2 which is turned on, thereby grounding the base of Q3 over line 92. This turns off Q3 and enables operation of the ultrasonic ranging module 80.

Let's assume now that the strobe unit 26 is not fully charged. Q7 will be turned off and its collector will be high, thereby back biasing diode D2 and raising the voltage level of the junction between D2 and D3. This provides a high input to the base of Q1 and input 1 of gate D. Q1 turns on, bringing its collector to a low potential via the connection to ground line 93 so that the input to the base of Q2 is now low. Q2 turns off, raising the base input voltage of Q3 to a high state through series resistors R3 and R4, connected between supply line 84 and the base of Q3, thereby turning on Q3 and dropping the voltage level of line 88 to 0 potential for disenabling module 80. Thus, a logic 1 signal from Q7, indicating that the strobe unit 26 is not in its fully charged state, sets the input at line 86 at a logic 1 level and causes the operation of ranging module 80 to be disenabled over line 88.

The audio signal generator 70 shown in FIG. 1 is formed by oscillator gate A and inverter gate B. When a logic 1 or high input is provided to input terminal 1 of gate A, it begins to oscillate at a frequency determined by the RC network formed by resistor R5 and capacitor C1. The output from gate A is fed back to input 2 in a conventional well-known manner. In the illustrated embodiment, the values selected for R5 and C1 set the audio frequency output in the range of 3–5 khz. When the logic signal to input 1 of gate A becomes low, the oscillator output is cut off. The series connected gate B having its inputs 1 and 2 connected together merely serves as an inverter as is well-known in the art.

The output from gate B is connected to input 1 of NAND gate C. Input 2 of gate C serves as the gate enable input, and enables gate C when it is at a logic 1 or high level. When both inputs 1 and 2 of gate C are at a logic 1 level, the output will be 0. The output of gate C is connected through current limiting resistor R6 to the base of Q5. Q5 and the cascaded Q6 serve as a buffer amplifier to isolate the relatively high current (approximately 2–2.5 amps) which flows in the primary coil of transistor T1 to drive the sonic transducer 40. Thus, when the output of gate C is 0, Q5 is turned off, causing the voltage level at the base of transistor Q6 to be high. This turns on Q6 and grounds the negative end of the primary coil of transformer T1 thereby allowing current to flow therethrough from the battery to electrically drive the sonic transducer 40. Conversely, when the output of gate C is at a high or logic 1 level (responsive to either one or both of the inputs of gate C being set at 0), Q5 turns on and Q6 turns off, cutting off the current flow in the primary coil of the transformer T1.

The logic input to input 1 of gate A is controlled by the voltage level of the collector of Q4. If Q4 is turned on, bringing the voltage at the bottom of resistor R3 near the ground potential of line 90, there is a low input to input 1 of gate A thereby disenabling the oscillator. Conversely, if Q4 is off, there is a high input at input 1 which starts the oscillator. The oscillator will continue to run at the audio frequency until the signal at input 1 is switched from logic 1 to 0.

The base of Q4 is connected to an RC timing network defined by series connected resistor R7 and capacitor C2 coupled between the supply line 84 and ground line 90.

Before S1 is closed, capacitor C2 is in a fully discharged state facilitated by bleed resistor R8. When S1 is closed, C2 is essentially a short circuit to ground maintaining the base of Q4 at a low level so that it is turned off thereby providing a high input signal to input 1 of gate A which causes the oscillator to operate. As capacitor C2 charges up, the base bias level of Q4 increases until it reaches the point where Q4 is turned on. This drops the input level to input 1 of gate A and cuts off the oscillator.

Thus, upon closure of S1 the audio frequency oscillator is automatically turned on until capacitor C2 charges to a predetermined value whereby Q4 is turned on. The time that the audio frequency oscillator will be running, of course, is determined by the values selected for R7 and C2.

Figure 3:
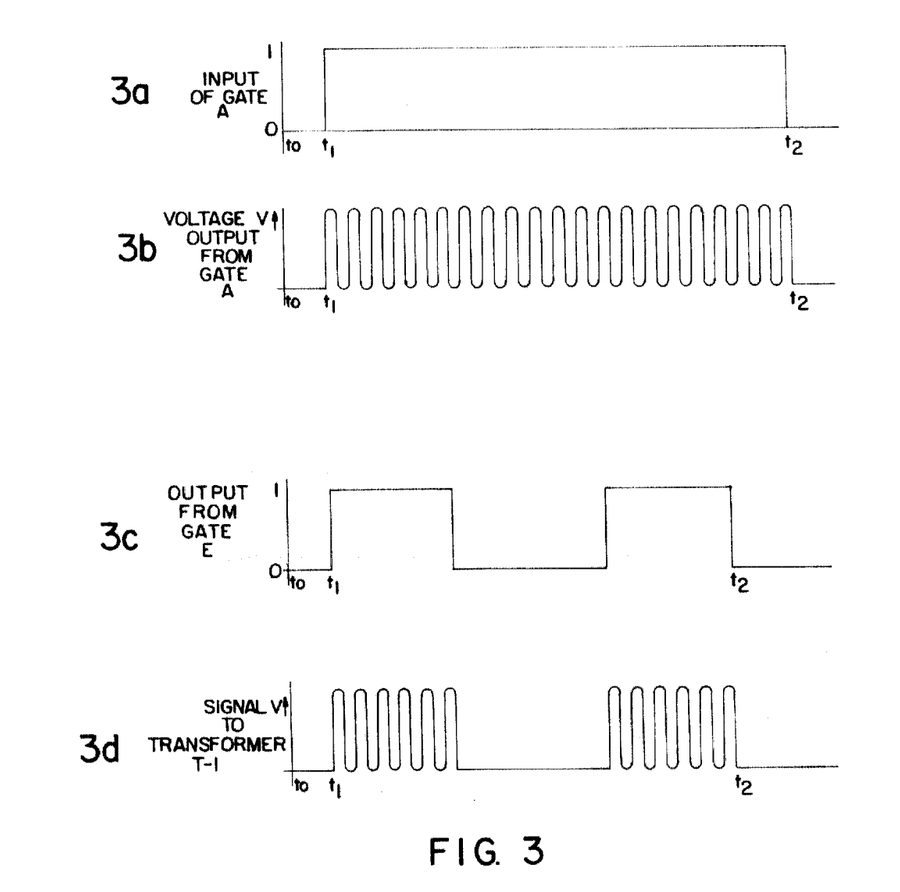
FIG. 3 graphically show signal levels at various points in the circuit as a function of time.

FIG. 3a shows the logic level of input 1 of gate A as a function of time. At T0, before switch S1 is closed, the input level is 0 because there is no current flowing in the circuit. When S1 is closed at time t1 the input becomes high and remains high until time t2 when capacitor C2 has charged to the point of turning on Q4. Thus, from t0 to t1 there is no output from the oscillator. From t1 to t2, the oscillator output is an audio frequency signal approximating a sine wave and after t2 the output is cut off. This is shown in FIG. 3b.

If, between times t1 and t2, the gate enabling input 2 of gate C is high, then the same audio frequency signal will be provided to the primary coil of transformer T1 and sonic transducer will emit a single frequency tone for this time interval. For example, if the interval between t1 and t2 is one second, the audible information provided from sonic transducer 40 will sound like a long single tone "beep". If at any time during the interval t1 to t2 input 2 of gate C becomes low, the audio frequency signal will be cut off during those periods when input 2 is low. Conversely, if input 2 is brought to a logic 1 level during this time period, the audio frequency output will once again appear across the primary coil of transformer T1.

It should be understood that transducer 40, which may be of the type disclosed in the previously-noted U.S. Pat. Nos. 4,081,626; 4,085,297 and 4,215,249, has been specifically designed to be most efficient in the ultrasonic frequency range (50-65 khz) to perform its primary function as part of the ranging system. When operated in the audio frequency range, its efficiency is greatly diminished and the audio frequency power output is substantially lower than the ultrasonic frequency output for the same power input level. However, it has been demonstrated that the audio output is sufficient to emit an adequate audible signal level for providing information to the camera operator. Also a certain amount of inefficiency can be tolerated because the flat battery in the film pack is quite capable of delivering the 2 to 2.5 amps current drain required to drive the transducer at an audible level that the operator can hear easily.

Therefore, by not having to redesign the existing transducer to increase its audio frequency range efficiency and taking advantage of the power output capabilities of the existing battery now provided in the SX-70 film pack, the audio information system can be added to the camera at a relatively low cost. Also, the overall size of the camera does not have to be increased to accommodate a separate speaker for the audio frequency. The additional circuitry required is of the type that may be provided in one or two small integrated circuit chips which may be mounted in existing spaces within the camera housing.

The logic level of input 2 of gate C is controlled by the voltage level of input line 94. In the film pack empty mode, when switch S3 is closed, the battery voltage $V_b$ is provided over line 96 connected to line 82 in parallel with the gates D and E to a point ahead of current limiting resistor R9 through forward biased diode D4, thereby raising line 94 to the logic 1 level. Therefore, input 2 of gate C is high, thereby enabling a pass through of the audio frequency signal during the entire interval between times t1 and t2 to produce the long warning signal. Thus, the uninterrupted long warning signal indicates to the user that the film pack 18 is empty and that he must take corrective action by replacing the film pack before the camera is reset for proper operation.

To audibly distinguish the "flash not fully charged" inhibit from the "film pack empty" inhibit, a low frequency astable multivibrator or oscillator formed by gate D is coupled through series connected inverting gate E and current limiting resistor R9 along line 94 to the gate enable pin or input 2 of gate C and serves as a modulator or chopper for selectively switching input 2 of gate C between high and low states during the interval t1 to t2 for effectively dividing the long tone signal provided from the audio frequency oscillator (gate A) into a plurality of shorter interval audible signals.

For example, as shown in FIG. 3C, if the gate E output (inverted gate D oscillator output) is arranged to go high during the first and last third of the t1 to t2 interval, and to go low during the middle third, the output signal from the gate A oscillator will pass through to the transducer 40 during the beginning and end of the interval, but will be cut off during the middle so that the operator will hear two distinct short tone signals (see FIG. 3D) as opposed to the long tone signal illustrated in FIG. 3B. Thus, the gate D oscillator is used as a modulator to encode the output of the audio system for the purpose of clearly and uniquely identifying a corresponding failure or inhibit mode.

Input 1 of gate D is connected to the junction of diodes D2 and D3 with resistor R10 along line 97. R10 is, in turn, connected to the positive voltage supply line 84 over line 98. When input 1 of gate D is raised to the logic 1 level, it will oscillate at a frequency determined by values of resistor R11 and capacitor C3. When input 1 is reduced to 0, the oscillating output signal is cut off.

The series connected gate E, having inputs 1 and 2 at a common voltage level, merely serves as an inverter.

When the strobe unit 26 is fully charged, transistor Q7 is saturated or turned on, bringing the voltage level of line 86 to ground. Thus, the potential between diodes D2 and D3 is at ground, so that input 1 of gate D is at the 0 level and the low frequency oscillator is turned off. If the strobe is not fully charged, Q7 is turned off, D2 is reverse biased thus raising the level of the junction between D2 and D3 and the potential along line 97 to turn on the gate D oscillator to provide the output shown in FIG. 3c.

In summary, during the normal mode operation, when there is film in the film pack and the strobe is fully charged, there is a low level input to the base of Q1, to input 1 of gate D and to line 94. This means that input 2 of gate C is low so that an audible frequency generated by the gate A oscillator will not pass through to the sonic transducer 40. Q1 is off, Q2 is on, Q3 is off, thereby enabling operating of the ultrasonic ranging module 80.

In the "film pack empty mode" the S3 switch is closed in the manner previously described providing a high level input to the base of Q1 and the enabling input 2 of gate C thereby enabling gate C to pass through the audio frequency signal from the gate A oscillator. Q1 turns on, Q2 turns off, Q3 turns on, disenabling the operation of ultrasonic ranging module 80. Because the enabling gate C is now in its effective pass through configuration, the relatively long tone provided from the gate A audio frequency oscillator will pass through to sonic transducer 40 to provide an audible indication to the user that the camera is out of film.

In the strobe not charged mode, the input to Q1 is high to cut off ranging module 80. Also, there is a logic level 1 provided to input 1 of gate D so that it modulates the enabling input 2 of gate C thereby providing the two distinct shorter tone signals to sonic transducer 40 providing the audible indication that the strobe is not fully charged.

It should be understood that it is within the scope and spirit of the present invention to provide alternative embodiments of camera 10 and circuit 78.

For example, range limits may be set in the ranging system and appropriate audible warning signals may be produced indicating that the subject is too close and cannot be focused properly by lens or that the subject is beyond the effective range of the flash illumination system.

The audio frequency signals may be varied in frequency rather than pulse number to signal each of the different sources of exposure cycles. Alternatively, the audible signal may be verbal in nature by incorporating a voice synthesizer chip into the audio system.

Although separate audio and ultrasonic frequency signal generators are shown in FIG. 1 to clearly show the separate functions, these may be combined into a single wide band generator that covers both frequency ranges.

Since other appropriate changes and modifications may be incorporated into the apparatus and sonic assembly disclosed herein without departing from the scope and spirit of the present invention, it is intended that all matter contained in the above description or shown in the accompanying drawings shall be interpreted as illustrative and not in a limiting sense.

What is claimed is:

1. A camera comprising:

a ranging system for providing a ranging signal indicative of subject distance, said ranging systems being formed in part by a sonic transducer that is electrically driven in the ultrasonic frequency range for emitting non-audible energy towards a subject and for thereafter detecting an echo returned therefrom in conjunction with providing said ranging signal; and an audio system formed in part by said same sonic transducer and including means for electrically driving said transducer in an audio frequency range for providing audible information to the camera operator.

2. The camera of claim 1 further including, a plurality of other camera systems each having an operative relationship with the exposure of a film unit, each of said other systems being configured to be set in an operable ready state before initiation of a film exposure cycle;

means for monitoring the ready states of each of said other systems before initiation of an exposure cycle and for providing a different system identifying electrical signal for each of said other systems that is not in its said ready state; and means forming part of said audio system and responsive to each of said different identifying signals for providing corresponding different audio frequency signals for driving said transducer to thereby provide an audible signal to the operator identifying which of said other systems is not in its said ready state.

3. The camera of claim 2 wherein one of said other systems includes a flash illumination system.

4. The camera of claim 3 wherein said flash illumination system includes a strobe unit and said monitoring and identifying signal providing means provides a corresponding identifying signal when the charge supplying storage capacitor in the strobe unit is not in a fully charged state.

5. The camera of claim 3 wherein said flash illumination system includes an array of flashbulbs and said monitoring and identifying signal providing means provides a corresponding identifying signal when flashbulbs are not in readiness for firing.

6. The camera of claim 2 wherein one of said other systems is a film counting system and said monitoring and identifying signal providing means provides a corresponding identifying signal when said counting system indicates there is no film unit left for the next exposure.

7. The camera of claims 1, 2, 3, 4, 5 or 6 further including means responsive to the provision of an identifying signal for inhibiting initiation of an exposure cycle until said identifying signal ceases in response to the setting of the corresponding one of said other systems in its said ready state.

8. The camera of claim 2 wherein said means for providing corresponding different audio frequency signals provides a single frequency tone signal in response to one of said identifying signals and modulates said signal frequency tone signal to provide a different audible indication to the operator in response to another one of said identifying signals.

9. The camera of claim 1 further including means for automatically activating said audio system in response to an electrical signal indicating that some portion of said camera is not in its normal operational state.

10. A sonic assembly for use in photographic apparatus wherein it forms part of both an ultrasonic ranging system that provides a ranging signal indicative of subject distance and an audio system that provides audible information to the apparatus operator, said assembly comprising:

an electro-acoustic transducer configured to be electrically driven in the ultrasonic frequency range for emitting an ultrasonic output signal towards a subject and thereafter detecting an echo signal returned therefrom in association with the provision of said ranging signal and also being configured to be electrically driven in the audio frequency range for producing an audio output signal in conjunction with operation of said audio system;

means responsive to a ranging input signal for electrically driving said transducer in said ultrasonic frequency range and also responsive to an information input signal for electrically driving said transducer in said audio frequency range;

means for providing said ranging input signal in response to actuation of said ranging system and;

means for providing said information input signal in response to actuation of said audio system.

11. The sonic system of claim 10 wherein the photographic apparatus includes an exposure system for effecting exposure of a film unit and said sonic system further includes means responsive to actuation of said audio system for inhibiting operation of said exposure system until said audio system is deactivated.

* * * * *